Patented Mar. 29, 1938

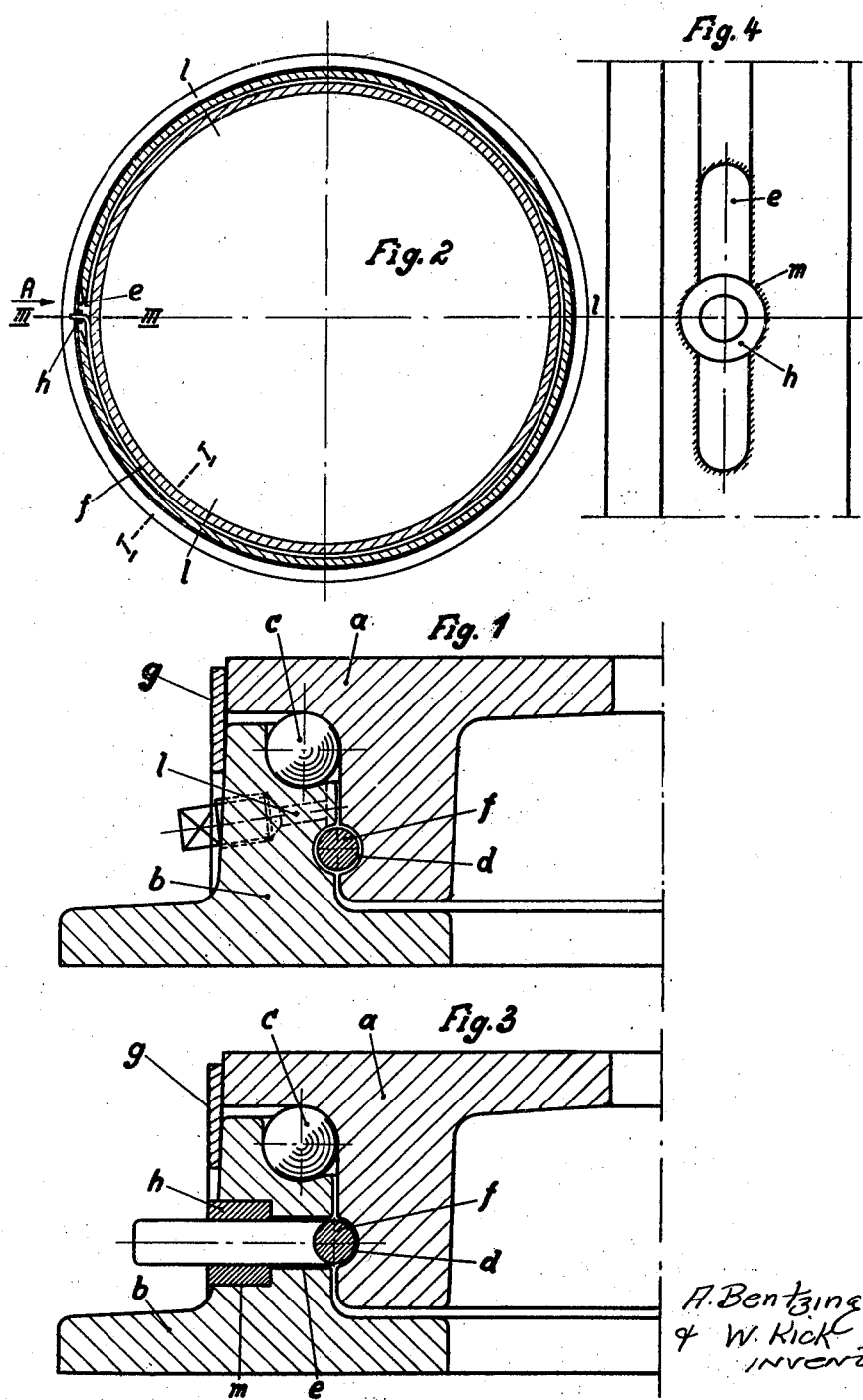

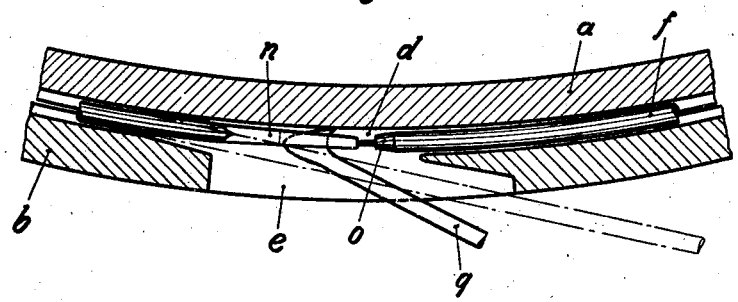
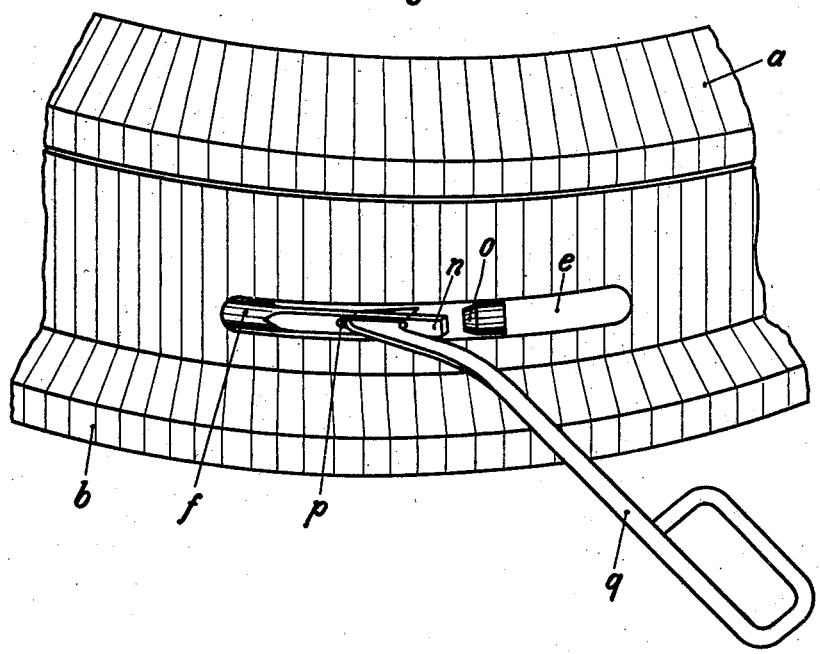

2,112,325

UNITED STATES PATENT OFFICE 2,112,325

MEANS FOR PREVENTING AXIAL SEPARATION OF THE BALL RACES OF BALL BEARINGS

Arthur Bentzinger and Wilhelm Kick, Dortmund, Germany, assignors to Eisenwerk Rothe Erde G. m. b. H., Dortmund, Germany Application October 13, 1936, Serial No. 105,433
In Germany October 14, 1935

3 Claims. (Cl. 308—230)

In vehicles, more particularly motor truck trailers, ball bearings are used for connecting the swinging wheel axles to the car body, in which ball bearings the ball running surfaces are arranged substantially obliquely or perpendicularly to the axis of rotation. It is possible by this arrangement of the running surfaces to take up the bearing pressure by means of a single ball ring, the said pressure directed obliquely to the plane of rotation and resulting from the horizontal tensile force or brake power and the car weight. However, ball bearings which are designed in the above manner must be secured against axial separation of the ball races of the ball bearings.

It has already been proposed to secure the two ball races of ball bearings against axial separation by providing in addition to the ball ring which takes up the actual load of the bearing a further ball ring which only serves the purpose of preventing the axial separation. According to these known constructions, a ball ring is provided as means for preventing the axial separation, the balls being inserted in a special ball race connected by screws to one of the two ball races of the ball bearing and rolling in the other ball race of the ball bearing. Consequently, when passing through impact holes, the means for preventing axial separation and the groove will be subjected to great stresses intermittently whereby a bending of the groove and a loosening of the screws will take place in due course. Since the axial separation preventing means receives play owing to the loosening of the screws and the bending of the groove, the ball races of the ball bearing are adapted to be removed from each other in an axial direction. Owing to the shock or jerk, which takes place in an axial direction when passing through impact holes, the car body will be raised with the upper ball race connected thereto and fall back again in consequence of the weight of the car so that the balls of the ball bearing itself are subjected to a dangerous stress, namely by shock. For this reason, it is necessary in connection with the known constructions to carefully design and dimension the ball races provided for the ball ring of the axial separation preventing means. A constant control or supervision of the bearing is also necessary in connection with the known construction.

All the above mentioned drawbacks are obviated according to the present invention which constitutes an easily accessible arrangement of the axial separation preventing means, said arrangement being very simple and adapted to take up the intermittent load. The axial separation preventing means is a round steel wire which is inserted in the circular grooves formed out of the two semi-circular grooves of the two ball races of the ball bearing. The recess provided for the insertion of the steel wire is preferably arranged in the outer ball race. The rectangularly bent end of the steel wire is preferably provided with a sleeve embedded in a cylindrical recess of one ball bearing.

A very simple and advantageous construction or arrangement of the axial separation preventing means is obtained by tapering or rounding off both ends of the steel wire which is circularly bent throughout its entire length. According to this construction, at least one of the two ends of the steel wire is preferably provided with a hole for the withdrawal of the steel wire, said hole extending transversely to the axis of the steel wire.

Constructions of the axial separation preventing means according to the present invention are shown in Figures 1 to 6 of the accompanying drawings.

Figure 1 is a section through the ball bearing.

Figure 2 is a section through the ball bearing parallel to the plane of rotation on a level with the round steel wire.

Figure 3 is a section on line III—III of Figure 2.

Figure 4 is an enlarged view of the opening for the insertion of the round steel wire, as seen in the direction A.

Figures 5 and 6 show a construction of the axial separation preventing means with tapered or rounded off wire ends in a section and in a perspective view respectively.

In the figures of the drawings, $a$ and $b$ indicate the two ball bearing races between which is arranged the ball ring $c$ for the transmission of the load of the bearing. A steel wire $f$ is provided for absorbing or taking up the shocks which arise when passing through impact holes and which endeavor to separate the races in the direction of the axis of rotation. The steel wire $f$ is inserted through a recess $e$ of the outer ball race into the circular groove between the two ball races, said groove being formed out of the two semi-circular grooves $d$. The said steel wire is pushed through until the beginning of the round steel wire again appears at the recess. In order to facilitate the insertion of the round steel wire, the corners of the recess are preferably bevelled off as shown in Figures 1 and 5.

In the construction according to Figures 1 to 4, the projecting end $k$ of the round steel wire is bent at right angles and held in a special sleeve $h$, which is slipped over the bent end of the round steel wire and secured in a circular recess $m$ of the ball bearing.

In the construction according to Figures 1, 5, and 6, the wire $f$ is circularly bent throughout its entire length. The ends $n$ and $o$ are tapered or rounded off. A hole $p$ is provided in one wire end for the withdrawal of the wire and the hook $q$ is inserted in the said hole.

The use of a round steel wire as axial separation preventing means affords special advantages for the lubrication of the ball bearing. If the lubricating holes $l$ (Figure 2) are arranged between the steel wire $f$ and the ball ring $c$, the wire simultaneously constitutes a packing of the ball bearing for preventing the entry of dirt from the inside of the ball bearing. A special collar designated $g$ in the figure serves as packing of the ball bearing for preventing the soiling from the outside.

Having thus fully described the invention what is claimed as new and desired to be secured by Letters Patent is:—

1. In a bogie frame, more particularly for motor truck trailers, a pair of interengaged ball bearing rings of a large diameter and having ball races therein with the ball running surfaces arranged substantially obliquely or perpendicularly to the axis of rotation of the bearing and further provided with grooves in adjacent surfaces of both of the rings so as to form an annular passageway, and a steel wire insertable in the passageway for axially connecting the two rings together and preventing separation thereof.

2. Means for preventing axial separation of ball bearings including in combination, a pair of interengaged ball bearing rings having ball races therein with the ball running surfaces arranged substantially obliquely or perpendicularly to the axis of rotation of the bearing and further provided with grooves in adjacent surfaces of both of the rings so as to form an annular passageway, a wire insertable in the passageway for axially connecting the two rings together and preventing separation thereof, one of the ball rings being provided with a slot arranged in communication with the passageway to facilitate the insertion of the wire into the passageway, one end of the wire being angularly bent to project through the slot and to serve as a stop, the opposing side walls of the slot being provided with opposed semi-circular recesses, and a sleeve carried by the bent end of the wire adapted to be embedded in the recess subsequent to the insertion of the wire in the passageway.

3. A device as claimed in claim 1, in which the ends of the wire are tapered, and the wire being circularly bent throughout its entire length.

ARTHUR BENTZINGER.
WILHELM KICK.